No. 819,658. PATENTED MAY 1, 1906.
J. M. JOHNSON.
SCRAPER FOR VEHICLES.
APPLICATION FILED OCT. 10, 1905.
2 SHEETS—SHEET 2.
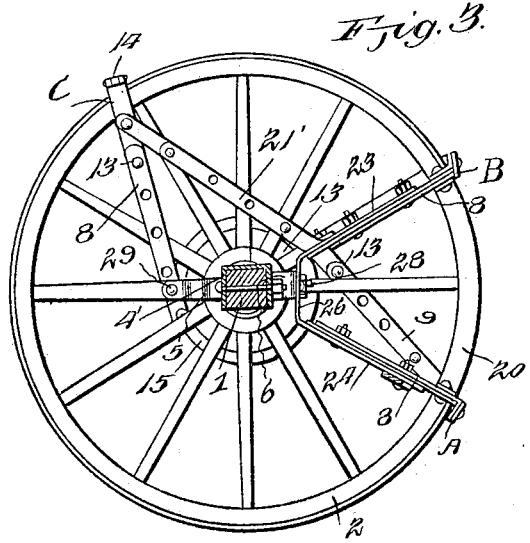
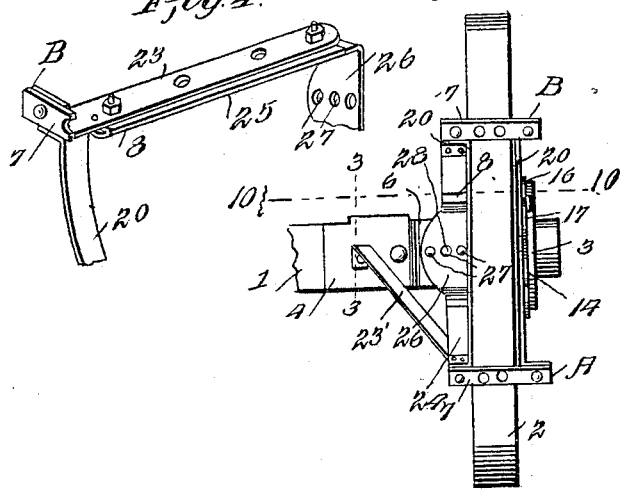
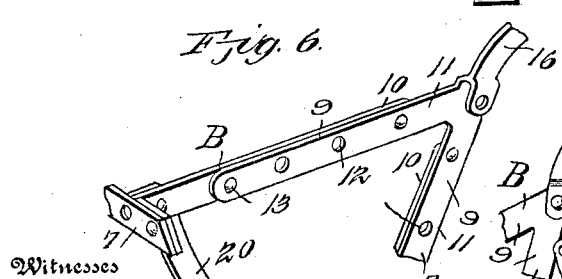
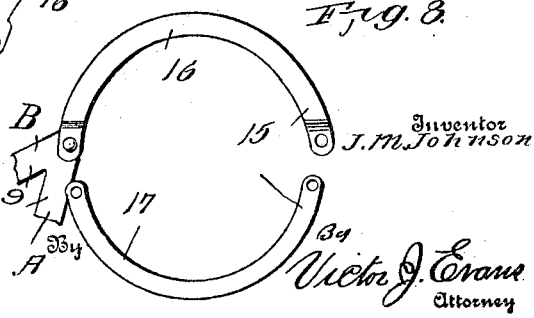
Witnesses
A. M. Langley
C. C. Hines
Inventor
J. M. Johnson
By Victor J. Evans
Attorney

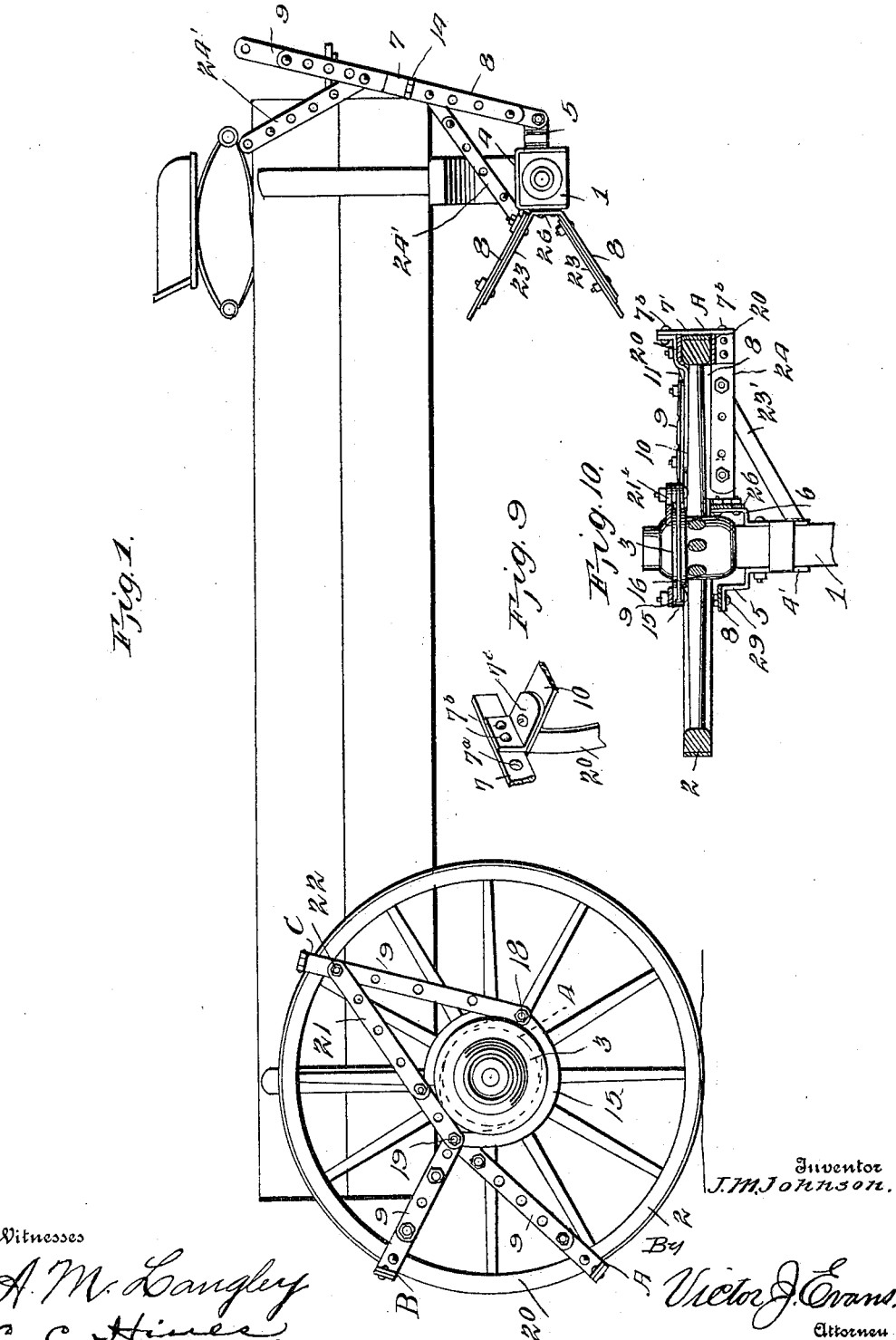

UNITED STATES PATENT OFFICE.

JAMES M. JOHNSON, OF DURANT, INDIAN TERRITORY.

SCRAPER FOR VEHICLES.

No. 819,658.     Specification of Letters Patent.     Patented May 1, 1906.

Application filed October 10, 1905. Serial No. 282,208.

*To all whom it may concern:*

Be it known that I, JAMES M. JOHNSON, a citizen of the United States of America, residing at Durant, in the county of Blue, Choctaw Nation, Indian Territory, have invented new and useful Improvements in Scrapers for Vehicles, of which the following is a specification.

This invention relates to scraping apparatus for removing mud and ice from the wheels of vehicles, and has for its object to provide simple and effective means of this character which may be readily applied to the wheels of vehicles already in use and wheels varying in size to remove the mud or ice therefrom as the wheels revolve when the vehicle is in motion.

Another object is to provide mud or ice removing or scraping devices which are simple of construction, strong, durable, and efficient in use, easily applied and removed and adjusted to different sizes of wheels, and adapted to permit of the ready disconnection of a wheel from its spindle for lubrication or other purposes and its reapplication thereto without the necessity of entirely disconnecting the scraper.

Still another object is to provide a scraping device wherein the parts are so relatively arranged as to secure the most efficient scraping operation and effect a mutual bracing action, insuring maximum strength and durability.

In many sections the character of the soil is such that wagon and other vehicular travel after rain is impeded and rendered difficult owing to the tenacity with which the mud sticks to the wheels and the rapidity with which it accumulates thereon, occasioning loss of time and money and annoyance to farmers, teamsters, and others depending to a greater or less extent upon the transportation of freight and commodities in vehicles drawn by animal or other power. My invention is intended to overcome this difficulty by the production of means for removing the mud from the wheels as fast as it accumulates thereon, thus reducing the impediment to travel of the vehicle.

With the above and other objects in view the invention consists of the novel construction and combination of parts hereinafter fully described and claimed, reference being had to the accompanying drawings, in which—

Figure 1 is a side elevation of a farm-wagon, showing one of the rear wheels thereof equipped with my invention and also showing the inner supports of the scraping device for the near front wheel, the forward scraper being represented as turned up to permit of the application and removal of the wheel. Fig. 2 is a rear elevation of the rear wheel and applied parts. Fig. 3 is a section on line 3 3 of Fig. 2 looking toward the inner side of the wheel. Fig. 4 is a fragmentary perspective view of the yoke and one of the rear scrapers. Fig. 5 is a perspective view of one of the complete scrapers. Figs. 6, 7, 8, and 9 are details of parts of the invention. Fig. 10 is a sectional plan view taken substantially on line 10 10 of Fig. 2.

Referring now more particularly to the drawings, wherein like reference characters designate corresponding parts throughout the several views, the numeral 1 designates a vehicle-axle; 2, a wheel mounted upon the spindle thereof. Fixed to the outer end of the hub of the wheel in any suitable manner is a collar or head 3, having a grooved periphery 4, and bolted or otherwise fixed to the end of the axle is a clip, cuff, or collar 4', provided with forwardly and rearwardly projecting bracket-arms 5 and 6. These, in connection with the split retaining band or ring hereinafter described, constitute inner and outer supports on opposite sides of the wheel for holding the scraping devices in operative position, which scraping devices are also sustained and connected with the band by bracing members.

Each scraper, of which any desired number may be used, comprises a scraping blade or member 7, adapted to extend transversely of and in close proximity to the rim of the wheel and supported upon the outer ends of inner and outer supporting-arms 8 and 9, adapted to be arranged on opposite sides of the wheel and to extend radially or tangentially from the collar or head 3. Each arm 8 or 9 consists of two or more sections 10 and 11, provided with series of openings 12 for the passage of bolts or rivets 13 to adjustably connect the sections, so that the arms may be shortened or lengthened for application to wheels of different diameters. The scraping blade or member 7 may be formed integrally with the outer supporting-arm and hinged or pivoted to the inner supporting-arm, as indicated at 14, so as to permit the outer arm to be swung or turned upwardly or outwardly on the hinge connection clear of the wheel to permit the latter to be applied to or removed from its spindle without interference or the necessity of disconnecting the inner arm 8 from the inner support, or, as particularly shown in Figs. 9 and 10, the scraper 7 may be provided at each end with a series of openings 7ª for the reception of bolts or other fastening members 7ᵇ, connecting the same with ears or projections 7ᶜ upon the outer ends of the sections 10 of the supporting-arms 8 and 9, whereby the scraper is adjustably mounted to suit different widths of wheel-rims. In practice the scrapers may set at any desired angle of inclination relative to the rim of the wheel to effectively act thereon for the removal of the mud and to discharge the latter in any desired direction. In the present instance I have shown the application of three such scraping devices to the wheel, two of the scraping devices, A and B, respectively, being arranged to operate upon the wheel in rear of the center line thereof, while the other scraper C is arranged to operate upon the wheel in advance of the center line. A plurality of scrapers are preferably employed in rear of the center line of the wheel in order to successively act upon the rim upon the portion first coated with mud or ice in the normal direction of rotation of the wheel or when the vehicle moves forwardly to quickly relieve the wheel of the weight of the deposits, the forward scraper C acting to remove any portion of the mud or ice which may escape the scrapers A and B. The inner ends of the outer arms 9 of the scraping devices are bolted or otherwise secured to a retaining ring or band 15, seated in the grooved periphery 4 of the collar or head 3 and held thereby from outward movement to effectively support the outer arms and their bracing connection, the grooved connection permitting the band to be held in position without interfering with the free rotation of the wheel. In practice a suitable lubricant may be used in the groove 4 to reduce friction between the same and the band. The band is preferably of sectional construction in order to permit of its ready application and removal and is here shown as composed of two sections 16 and 17, the adjoining ends of the sections at one side of the ring being attached to each other and to the outer arm of the forward scraping device C by a bolt 18, while the opposite ends of the section at the diametrically opposite side of the band are connected with each other and with the outer arm of the scraping devices A and B by a bolt 19. Braces 20 connect the outer ends of the arms of the scraping devices A and B and are arranged on opposite sides of the rim of the wheel to hold said scraping devices in properly-spaced relation. If desired, the sections of the arms of the scraping devices which connect with the band 15 may be integral with each other and with one section of the band, as illustrated in Figs. 6 and 8; but I do not limit the invention to this construction or any other details, as the parts may be constructed and arranged in any suitable manner within the scope of the invention so long as the principle of the invention is carried out. The bolt 19 is also used as a medium for attaching one end of a brace 21 to the band, which brace extends between the band and the outer supporting-arm of the scraping device C and is connected at its other end with the latter by a bolt 22, thus firmly supporting the outer portion of the forward scraper in position.

The inner supporting-arms 8 of the rear scraping devices A and B are connected to the side arms 23 and 24 of a substantially V-shaped yoke or bracket frame 25, the vertex or connecting portion of which is in the form of a plate 26, having a series of apertures 27 for the passage of a bolt 28, connecting it with the bracket-arm 6 in such manner as to permit the yoke to be adjusted toward and from the wheel to accommodate different widths of wheels and compensate for the adjustment of the scraper-blades. The inner arm of the forward scraper member C is adjustably connected by a bolt 29 with the forwardly-projecting bracket-arm 5, whereby the inner members of all three scraping devices are rigidly connected by the clip 4' with the axle and firmly supported upon the inner side of the wheel. The yoke 25 is connected with the inner supporting-arm of the scraping member C by a brace 21', corresponding in construction to the brace 21, each of such braces, as shown in Fig. 7, being composed of two sections 21ª and 21ᵇ, having series of perforations for the passage of bolts to adjustably connect them. Thus all the parts of the scraping mechanism are rendered adjustable for ready application to vehicle-wheels of different widths and diameters.

The construction and mode of operation will be readily understood from the foregoing description, taken in connection with the accompanying drawings, and it will be seen that the invention provides scraping means which possesses the desirable advantages enumerated above and which will quickly and cleanly remove mud or ice from the wheels.

The structure may be modified in many respects within the scope of the invention as defined by the appended claims to suit varying conditions of service and to meet various contingencies which may develop in practical use.

Having thus described the invention, what is claimed as new is—

1. In a scraper for vehicle-wheels, the combination with an axle and a wheel mounted thereon, of a plurality of scraping devices arranged in rear of the vertical line of the wheel in the direction of rotation thereof, a scraping device arranged in front of the vertical line of the wheel, braces connecting said front and rear scraping devices, means for supporting the scraping devices upon the inner side of the wheel from the axle, and common means for supporting the scrapers upon the outer side of the wheel from the hub thereof, said means being adapted to permit the hub to have free relative rotation.

2. In a scraper for vehicle-wheels, the combination with an axle and a wheel mounted thereon, of a plurality of scraping devices arranged in rear of the vertical line of the wheel in the direction of rotation thereof, inner and outer supporting-arms for said scrapers, braces between the arms of the scrapers, means for connecting the inner supporting-arms with the axle, and means for connecting the outer supporting-arms with the hub of the wheel, said means being adapted to permit the hub to have free relative rotation.

3. In a scraper for vehicle-wheels, the combination with an axle and wheel, of a grooved collar upon the hub of the wheel, bracket means carried by the axle, a scraper extending transversely of the wheel-rim, and inner and outer supporting members fixed to the bracket means and engaging the grooved collar to hold the scraper in operative position.

4. A scraper comprising a scraper member, arms for supporting said scraping member adapted to be arranged upon a wheel, and means for attaching said arms to an axle and the hub of a wheel, the latter being adapted to permit the hub to have free rotation.

5. In a scraper for vehicle-wheels, the combination with an axle, and a wheel mounted thereon, of a plurality of scraping devices arranged in rear of the vertical line of the wheel in the direction of rotation thereof, a scraping device arranged in front of the vertical line of the wheel, inner and outer supporting-arms for said scrapers, stays suitably connecting the arms of the scrapers, means for attaching the inner supporting-arms to the axle, and means for connecting the outer supporting-arms with the hub of the wheel, said means being adapted to permit the hub to have free relative rotation.

6. A scraper comprising a scraper member, inner and outer supporting-arms therefor, the scraper being hinged or pivoted to one of the arms, and means for respectively connecting the said inner and outer arms to an axle and wheel-hub.

7. A scraper comprising a scraper member, inner and outer supporting-arms therefor, means for connecting one of the arms to a wheel-axle, and means for connecting the other arm with the hub of a wheel, said means being adapted to permit the hub to have relatively rotary movement.

8. A scraper comprising a scraper member, inner and outer supporting-arms therefor, means for adjustably supporting the arms, means for connecting one of the arms to a wheel-axle, and means for connecting the other arm with the hub of a wheel, said means being adapted to permit the hub to have relatively rotary movement.

9. In a scraper for vehicle-wheels, the combination with an axle, and a wheel mounted thereon, of a plurality of scraping devices arranged in rear of the vertical line of the wheel in the direction of rotation thereof, a scraping device arranged in front of the vertical line of the wheel, supporting-arms for said scrapers arranged upon the inner and outer sides of the wheel, means for connecting the inner arms with the axle, and a band engaging the hub of the wheel to which the outer arms are attached, said band being suitably connected with the hub to permit the latter to have free relative rotation.

10. In a scraper for vehicle-wheels, the combination with an axle, and a wheel mounted thereon, of a plurality of scrapers arranged in front and rear of the vertical line of the wheel, inner and outer supports for said scrapers, means for connecting the inner supports with the axle, and means for attaching the outer supports to the hub of the wheel, said means being adapted to permit the hub to have free relative rotation.

11. A scraper for vehicle-wheels comprising a scraper member, inner and outer supporting-arms for said scraper member, means connecting the inner arm with the wheel-axle, and means for connecting the outer arm with the wheel-hub, said means being adapted to permit the hub to have free relative rotation.

12. A scraper comprising a scraper member, inner and outer supporting-arms for said scraper member, said arms being longitudinally adjustable, means for attaching the inner arm to the vehicle-axle, and means for attaching the outer arm to the wheel-hub, said means being adapted to permit the hub to have free relative rotation.

13. A scraper for vehicle-wheels comprising a scraper member adapted to extend transversely across the wheel-rim, inner and outer supporting-arms for said scraper member, means for respectively connecting said supporting-arms with the wheel axle and hub, the latter-named means being adapted to permit the hub to have free relative rotation, the outer supporting-arm being detachably connected with said means and hinged to the scraper, whereby it may be swung out of the way of the wheel to permit the latter to be removed from the axle.

14. In a scraper attachment for vehicle-wheels, the combination with an axle and wheel, of scrapers extending transversely across the wheel-rim, inner and outer supporting-arms for the respective scrapers, said arms being longitudinally adjustable, longitudinally-adjustable bracing connections between the arms, means for connecting the inner arms with the axle, and means for connecting the outer arms with the hub of the wheel, said means being adapted to permit the hub to have free relative rotation.

In testimony whereof I affix my signature in presence of two witnesses.

JAMES M. JOHNSON.

Witnesses:
J. Q. CABLE,
J C. ADAMSON.